United States Patent
Ekladyous et al.

(10) Patent No.: US 11,710,398 B2
(45) Date of Patent: Jul. 25, 2023

(54) MULTIPURPOSE VEHICLE LIGHTING

(71) Applicant: Ford Global Technologies, LLC, Dearborn, MI (US)

(72) Inventors: Albert Ekladyous, Shelby Township, MI (US); Lisa Hohmann, Clinton Township, MI (US); Udayakumar Ramasami, Novi, MI (US); Kelley Maria Adams-Campos, Ferndale, MI (US); Sarbjit Singh, Canton, MI (US); Ghassan E. Mady, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/881,127

(22) Filed: Jan. 26, 2018

(65) Prior Publication Data

US 2019/0236938 A1 Aug. 1, 2019

(51) Int. Cl.
*G08G 1/005* (2006.01)
*G08G 1/16* (2006.01)
*B60Q 1/04* (2006.01)
*B60Q 1/50* (2006.01)

(52) U.S. Cl.
CPC ............. *G08G 1/005* (2013.01); *B60Q 1/04* (2013.01); *B60Q 1/50* (2013.01); *G08G 1/166* (2013.01)

(58) Field of Classification Search
CPC ............. G08G 1/005; B60Q 1/04; B60Q 1/50
USPC ............. 340/944, 425.5, 468, 470, 472, 478
See application file for complete search history.

(56) References Cited

U.S. PATENT DOCUMENTS

| | | | |
|---|---|---|---|
| 6,404,334 B1 * | 6/2002 | Chao | B60Q 1/44 340/472 |
| 7,068,160 B2 * | 6/2006 | Tourneur | B60Q 9/00 340/468 |
| 8,954,252 B1 | 2/2015 | Urmson et al. | |
| 8,992,057 B2 | 3/2015 | Foley et al. | |
| 10,794,719 B2 * | 10/2020 | Kunii | B60Q 1/26 |
| 2003/0138131 A1 * | 7/2003 | Stam | G06K 9/00664 382/104 |
| 2007/0242339 A1 * | 10/2007 | Bradley | G08G 1/161 340/907 |

(Continued)

FOREIGN PATENT DOCUMENTS

| DE | 102012008870 A1 * | 11/2013 | ............ B60Q 1/50 |
|---|---|---|---|
| DE | 102012008870 A1 | 11/2013 | |

OTHER PUBLICATIONS

Hull, Rob article entitled "Rinspeed's new Oasis concept car has a steering wheel desk and dashboard garden," for This is Money, Published: 16:34 GMT, Dec. 7, 2016 | Updated: 18:59 GMT, Dec. 7, 2016, http://www.thisismoney.co.uk/money/cars/article-4009296/Rinspeed-s-new-concept-car-steering-wheel-desk-dashboard-garden.html, printed Nov. 6, 2017.

*Primary Examiner* — Daryl C Pope
(74) *Attorney, Agent, or Firm* — Frank A. MacKenzie; Bejin Bieneman PLC (57) ABSTRACT

A system includes a processor and a memory. The memory stores program instructions executable by the processor to make a first determination to provide light to operate a vehicle and, based on the first determination, actuate a first set of lights. The memory stores program instructions executable by the processor to make a second determination to provide a communication, and, based on the second determination, actuate a second set of lights to provide the communication.

18 Claims, 8 Drawing Sheets

(56) References Cited

U.S. PATENT DOCUMENTS

| | | | |
|---|---|---|---|
| 2008/0158360 A1* | 7/2008 | Katou | B60Q 1/143 348/148 |
| 2009/0231874 A1* | 9/2009 | Kishimoto | B60Q 1/04 362/538 |
| 2009/0273282 A1* | 11/2009 | Ballard et al. | B60Q 1/2607 340/468 |
| 2011/0199199 A1* | 8/2011 | Perkins | B60Q 1/506 340/435 |
| 2013/0051043 A1* | 2/2013 | Ehlgen | B60Q 1/143 362/466 |
| 2015/0163470 A1* | 6/2015 | Katsumi | G06F 3/013 348/746 |
| 2015/0179063 A1* | 6/2015 | Aziz | G08G 1/005 340/944 |
| 2016/0179094 A1 | 6/2016 | Sorokin et al. | |
| 2017/0038582 A1* | 2/2017 | Chau et al. | G02B 27/0101 345/7 |
| 2017/0088039 A1 | 3/2017 | Williams et al. | |
| 2017/0192224 A1* | 7/2017 | Logiudice | F21S 41/153 |
| 2017/0240098 A1* | 8/2017 | Sweeney et al. | B60Q 1/2611 340/463 |
| 2018/0118095 A1* | 5/2018 | Kunii | G01C 21/365 |

* cited by examiner

MULTIPURPOSE VEHICLE LIGHTING

BACKGROUND

Vehicles include various lamp assemblies for producing light external to the vehicle. For example, a vehicle may include a headlamp assembly that produces light and directs such light in a vehicle-forward direction, e.g., to illuminate a roadway in front of the vehicle. As another example, a vehicle may include a taillamp assembly to provide light in a vehicle-rearward direction, e.g., to provide vehicle conspicuity. As yet another example, a bus may include a destination sign, also known as a head sign, supported at a window of the bus, such as at a windshield, which illuminates to indicate a route of the bus. As one more example, a taxi may include an illuminated sign supported on a roof or instrument panel of the taxi to indicate the taxi is for hire. Such lamp assemblies add cost and complexity to vehicles.

DETAILED DESCRIPTION

Introduction

A system includes a processor and a memory. The memory stores program instructions executable by the processor to make a first determination to provide light to operate a vehicle and, based on the first determination, actuate a first set of lights. The memory stores program instructions executable by the processor to make a second determination to provide a communication, and, based on the second determination, actuate a second set of lights to provide the communication.

The memory may store instructions to actuate the second set of lights to provide the communication in response to detecting a pedestrian within a threshold distance of the vehicle.

The memory may store instructions to actuate the second set of lights to provide the communication based on a location of the vehicle.

The memory may store instructions to actuate the second set of lights to provide the communication in response to detecting a second vehicle within a threshold distance of the vehicle and having a right of way over the vehicle.

The first set of lights and the second set of lights may include one or more same lights.

The memory may store instructions to actuate one or more of the lights of the first set of lights to an off-state to actuate the second set of lights to provide the communication.

The memory may store instructions to determine a type of the communication before actuating the second set of lights to provide the communication.

The type of the communication may be one of identification and right of way.

A method includes making a first determination to provide light to operate a vehicle and, based on the first determination, actuating a first set of lights. The method includes making a second determination to provide a communication, and, based on the second determination, actuating a second set of lights to provide the communication.

The method may include actuating the second set of lights to provide the communication in response to detecting a pedestrian within a threshold distance of the vehicle.

The method may include actuating the second set of lights to provide the communication based on a location of the vehicle.

The method may include actuating the second set of lights to provide the communication in response to detecting a second vehicle within a threshold distance of the vehicle and having a right of way over the vehicle.

The first set of lights and the second set of lights may include one or more same lights.

The method may include actuating one or more of the lights of the first set of lights to an off-state to actuate the second set of lights to provide the communication.

The method may include determining a type of the communication before actuating the second set of lights to provide the communication.

The type of the communication may be one of identification and right of way.

A computer may be programmed to perform the method.

A computer readable medium may store program instructions executable by a computer processor to perform the method.

A system includes a lamp assembly for a vehicle, the lamp assembly including a plurality of lights. The system includes a computer having a processor and a memory storing program instructions executable by the processor to make a first determination to provide light to operate the vehicle and, based on the first determination, actuate a first set of lights of the plurality of lights. The memory stores program instructions executable by the processor to make a second determination to provide a communication, and, based on the second determination, actuate a second set of lights of the plurality of lights to provide the communication.

One or more of the lights of the plurality of lights may be LEDs.

The lamp assembly may be a headlamp.

The lamp assembly may be a taillamp.

The lamp assembly may include a housing, and the plurality of lights may be supported by the housing.

Figure 1:
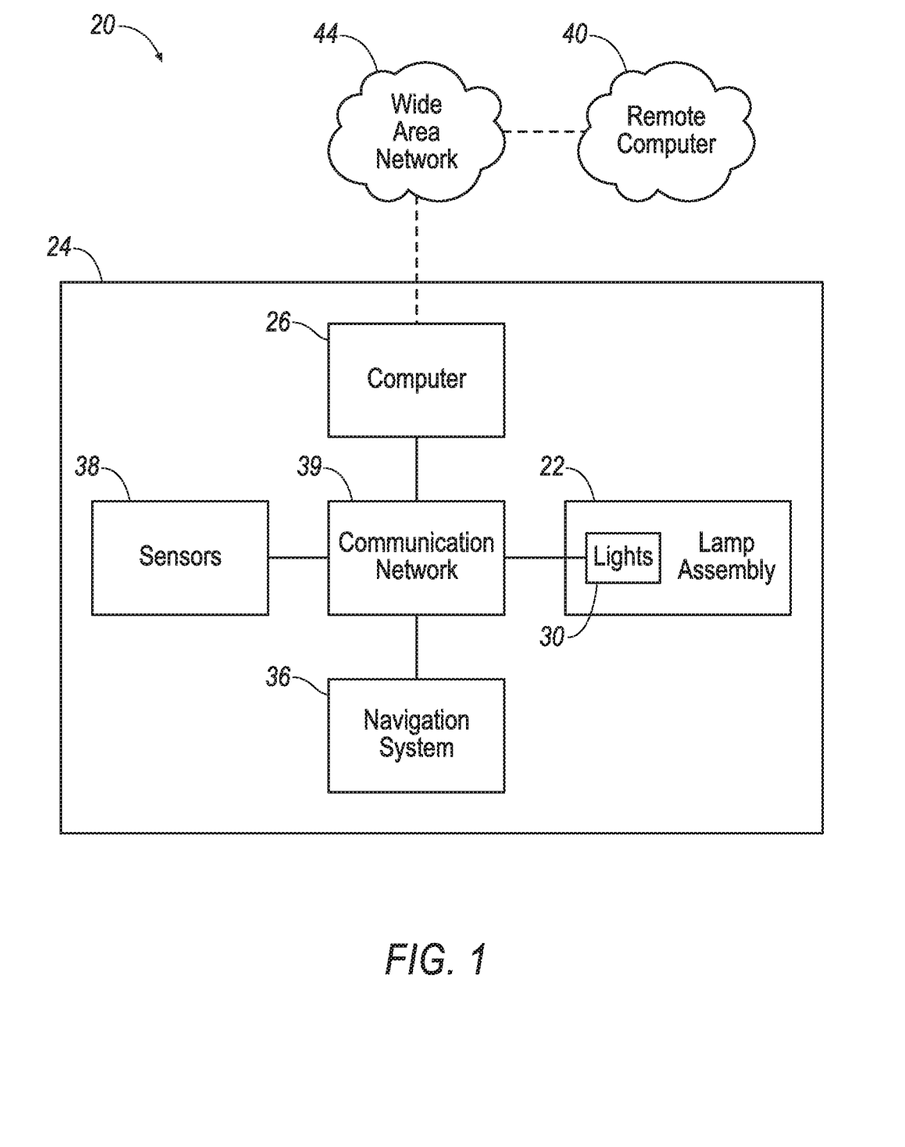
FIG. 1 is a block diagram of components of an example system to control a lamp assembly of a vehicle.

A system 20, shown in FIG. 1, for controlling a lamp assembly 22 of a vehicle 24 provides an advantageous arrangement of a computer 26, sensors 38, and the lamp assembly 22 including a plurality of lights 30. The system 20 determines whether and/or how to operate first and second sets of lights 30a, 30b, shown in FIGS. 4-7, of the lamp assembly 22 to provide light for operating the vehicle 24 and to provide a communication outside of the vehicle 24. The system 20 helps to reduce to overall complexity and cost of lighting for the vehicle 24 by utilizing the plurality of lights 30 to provide both light to operate the vehicle 24, e.g., with the first set of lights 30a, and light to communicate, e.g., with the second set of lights 30b. The system 20 includes the computer 26 typically programmed to make a first determination to provide light to operate the vehicle 24 and, based on the first determination, actuate a first set of lights 30a of the lamp assembly 22 to provide light to operate the vehicle 24. The computer 26 typically is further programmed to make a second determination to provide a communication, and, based on the second determination, actuate a second set of lights 30b of the lamp assembly 22 to provide the communication.

Light to operate the vehicle 24 is light that is required for operation of the vehicle 24 on a public roadway, e.g., light output within a certain range, e.g., light output based on amount of ambient light, time of day, etc., e.g., from the lights 30 of the lamp assembly 22.

Figure 5:
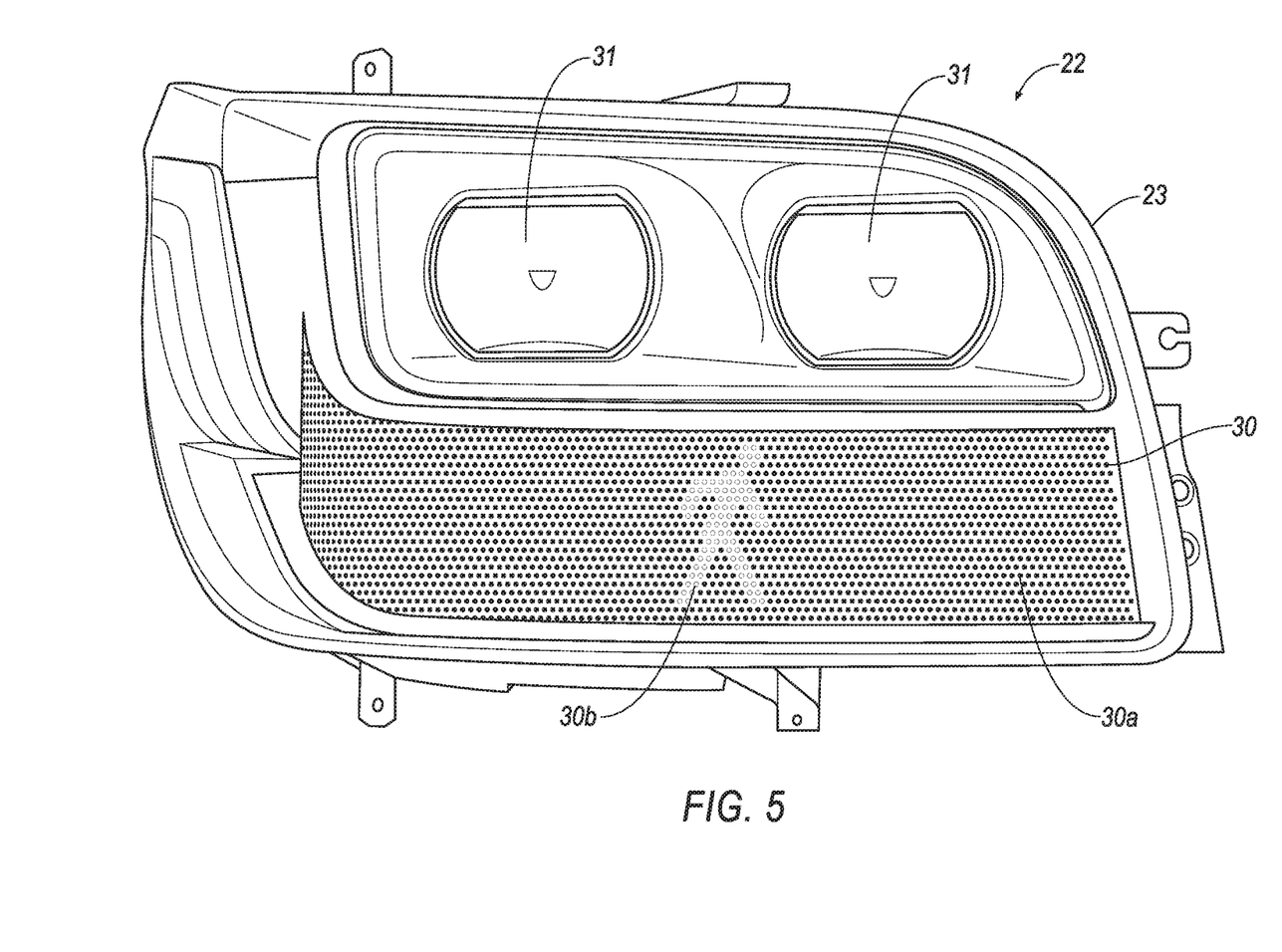
FIG. 5 is a perspective view of the lamp assembly of FIG. 4 with a second set of actuated lights providing a right of way communication.
Figure 6:
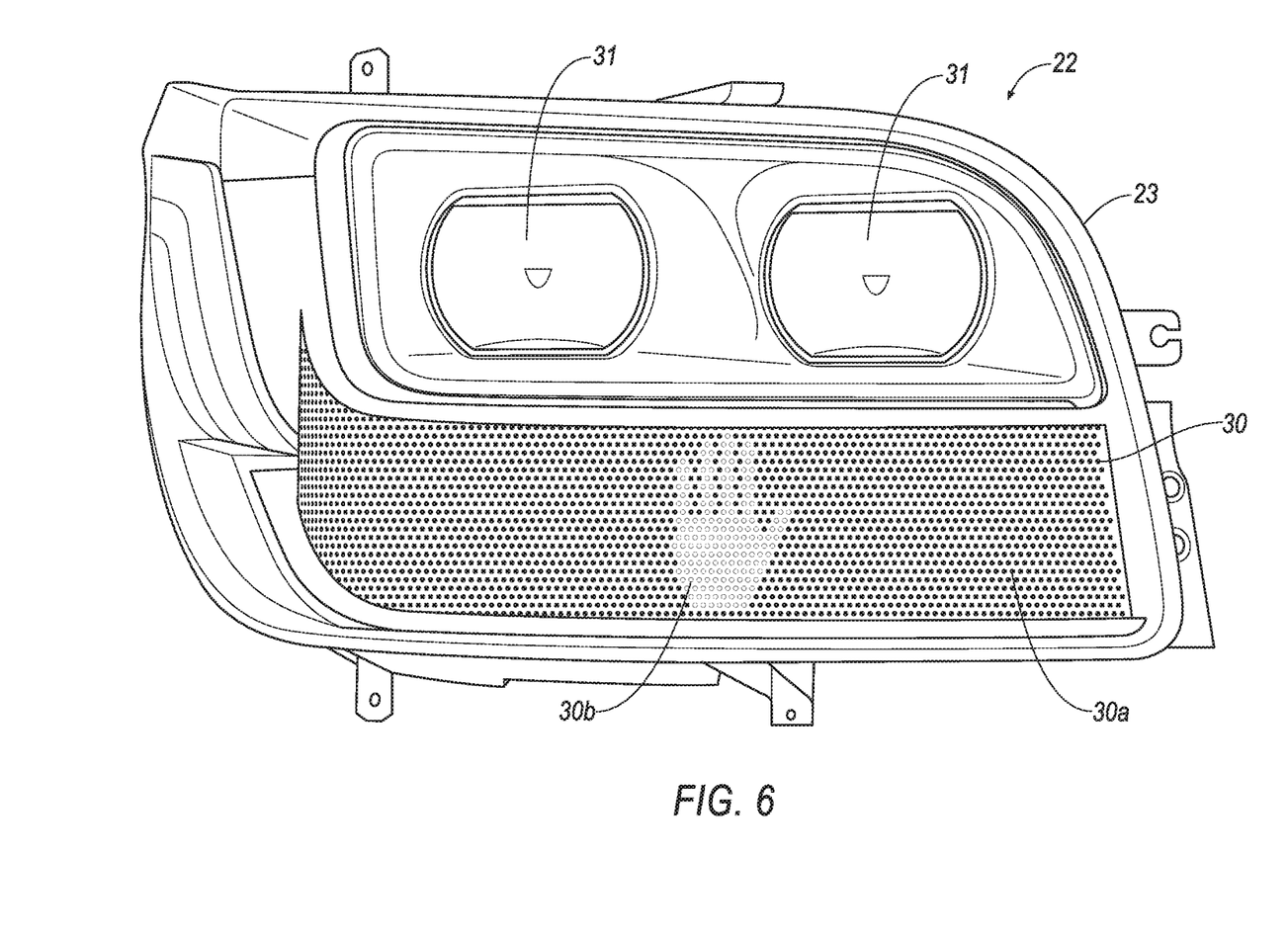
FIG. 6 is a perspective view of the lamp assembly of FIG. 4 with a second set of actuated lights providing a right of way communication.
Figure 7:
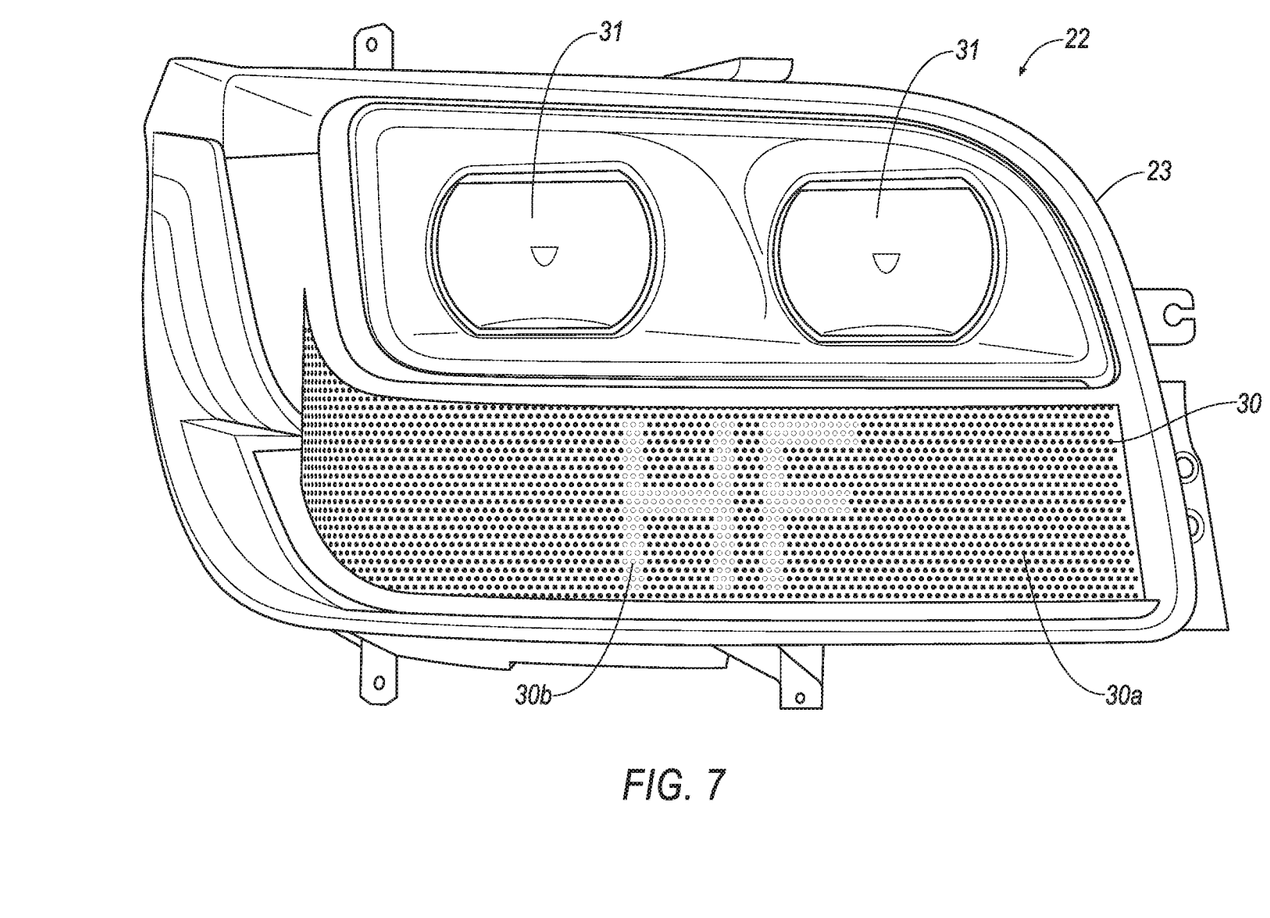
FIG. 7 is a perspective view of the lamp assembly of FIG. 4 with a second set of actuated lights providing an identification communication.

Light to provide the communication is a pattern of light, e.g., emitted by the lamp assembly 22, that may be detected by a naked human eye and understood as indicating a message. Example patterns are shown in FIGS. 5-7. For example, the second set of lights 30b may be selectively actuated to display a "walk" pattern (shown in FIG. 5) to indicate to a pedestrian 34 that he or she has a right of way to cross in front of the vehicle 24. As another example, the second set of lights 30b may be selectively actuated to display a "don't walk" pattern (shown in FIG. 6) to indicate to the pedestrian 34 that he or she does not have right of way to cross in front of the vehicle 24. As another example, the second set of lights 30b may be selectively actuated to display alphanumeric characters (shown in FIG. 7), e.g., to indicate to a pedestrian 34 waiting for a ride service that the vehicle 24 is intended to provide such service. To put it another way, the second set of lights 30b may be selectively actuated to indicate the initials of a pedestrian 34 that may have requested the ride service.

System

The vehicle 24 may be any passenger or commercial automobile such as a car, a truck, a sport utility vehicle, a crossover vehicle, a van, a minivan, a taxi, a bus, etc.

The computer 26 may operate the vehicle 24 in an autonomous state, a semi-autonomous state, or a non-autonomous state. For purposes of this disclosure, an autonomous state is defined as one in which each of vehicle 24 propulsion, braking, and steering are controlled by the computer 26; in a semi-autonomous state the computer 26 controls one or two of vehicle 24 propulsion, braking, and steering; in a non-autonomous state, a human operator controls the vehicle 24 propulsion, braking, and steering.

Figure 2:
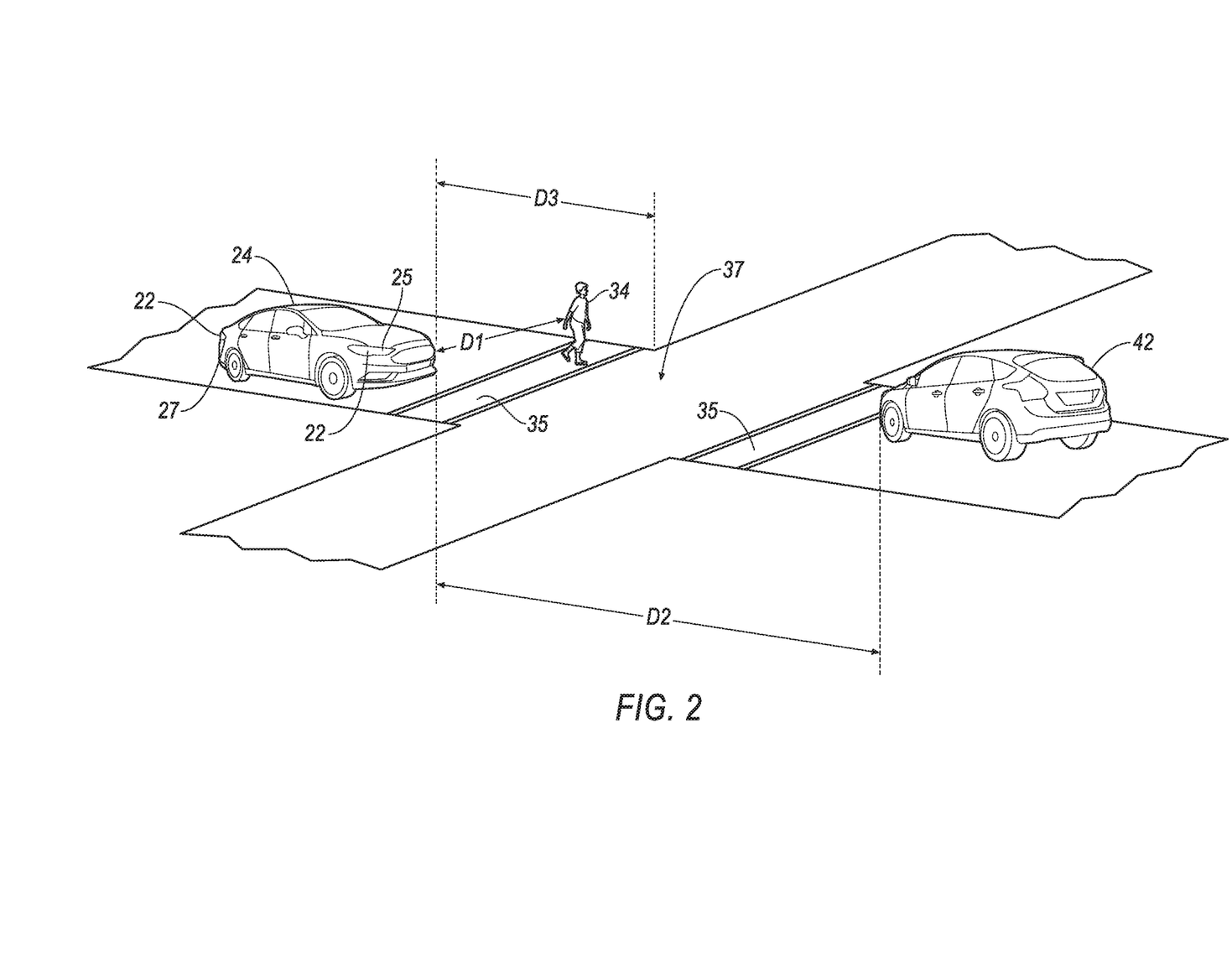
FIG. 2 is a perspective view of the vehicle of FIG. 1 having multiple lamp assemblies and at an intersection.
Figure 3:
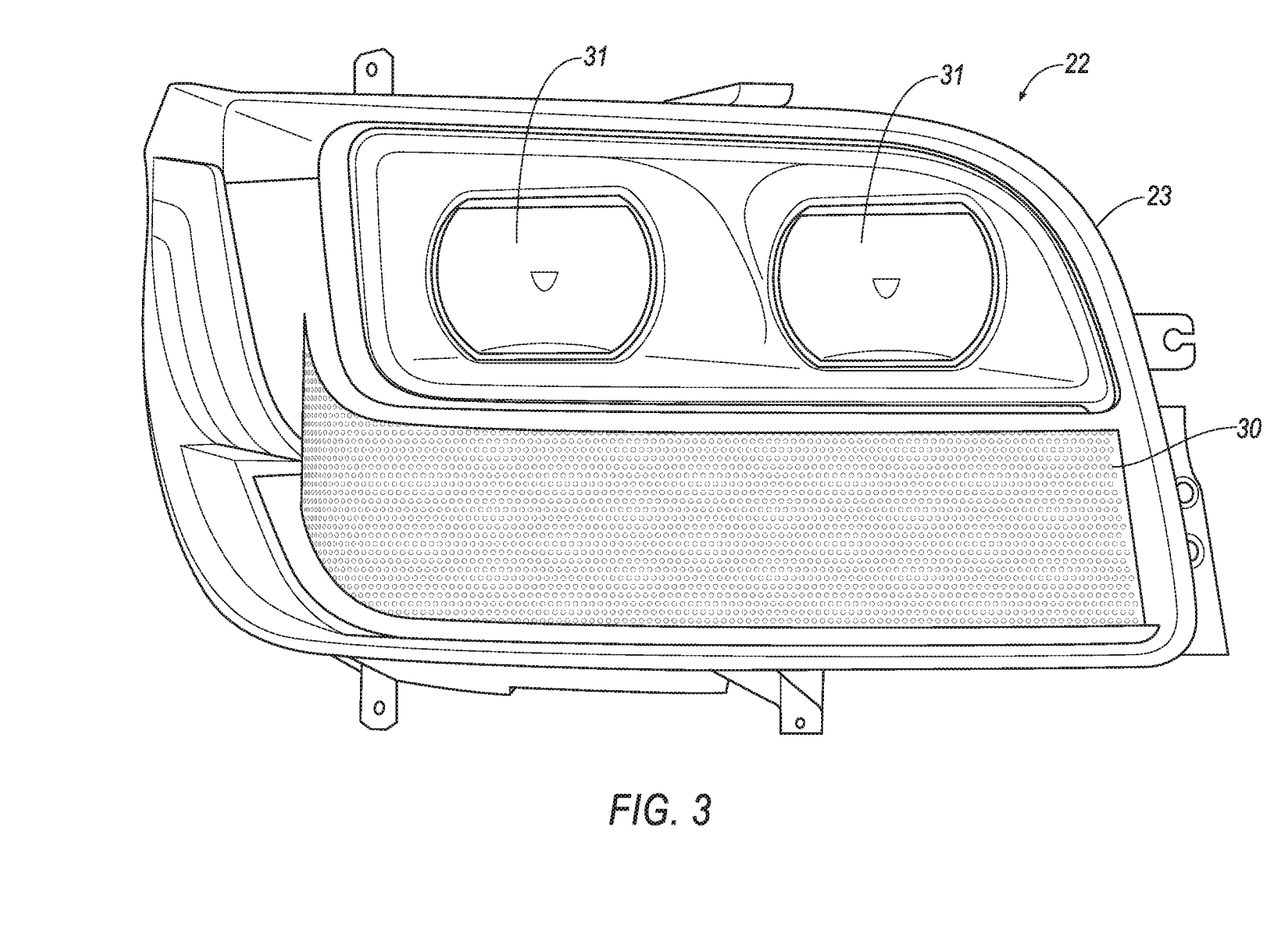
FIG. 3 is a perspective view of the lamp assembly of FIG. 1.
Figure 4:
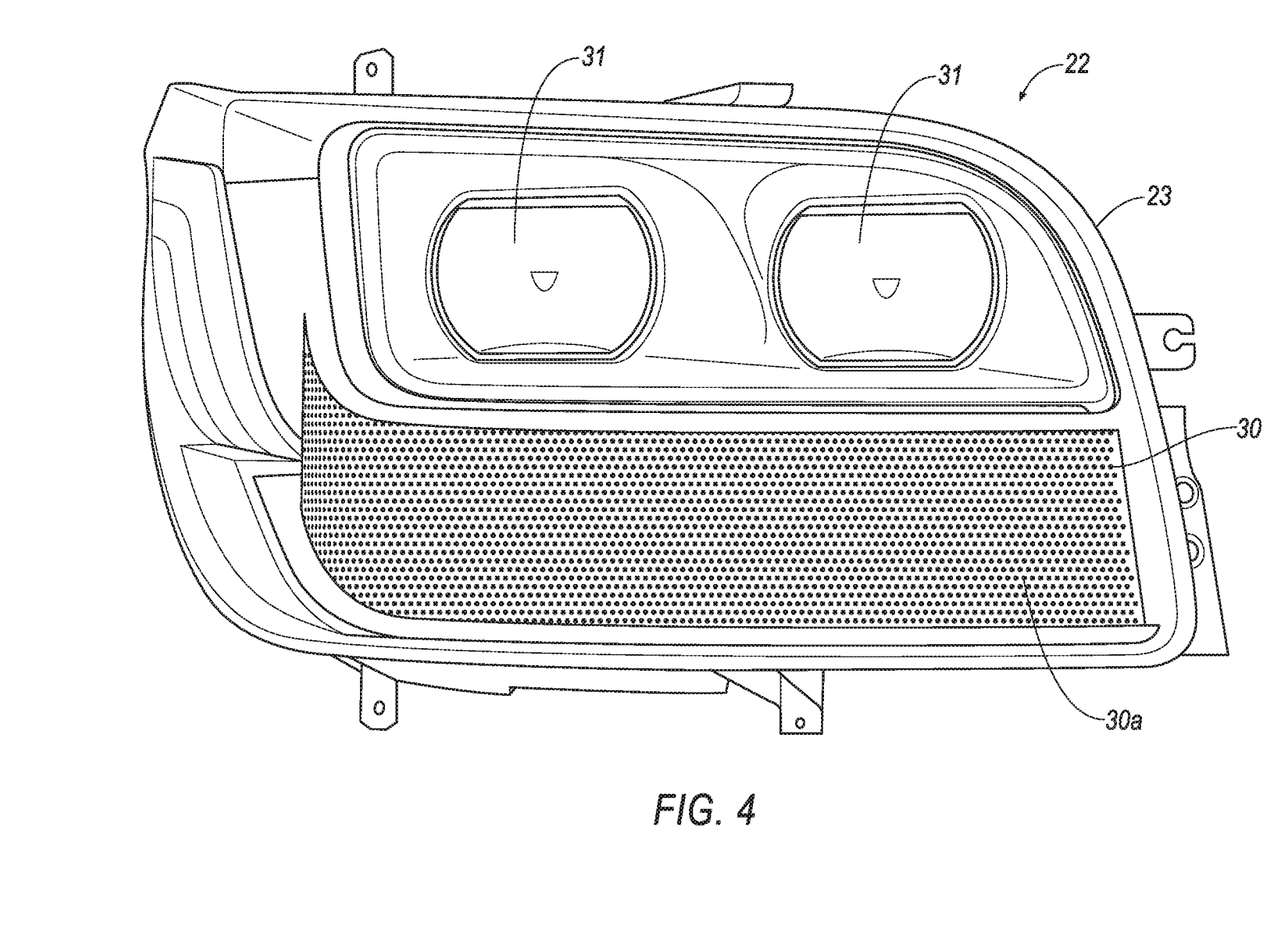
FIG. 4 is a perspective view of the lamp assembly of FIG. 3 with a first set of actuated lights.

The lamp assembly 22, shown in FIGS. 1-7, generates light and projects such light external to the vehicle 24. The lamp assembly 22 includes lights 30 (shown in FIGS. 3-7), and may include a reflector, a lens, etc. The lamp assembly 22 may include a housing 23. The housing 23 may support the lights 30, reflector, lens, etc. For example, as shown in FIG. 2, the lamp assembly 22 may be a headlamp 25, a taillamp 27, etc. The headlamp 23 is supported at a front of the vehicle 24 and can project light in a vehicle-forward direction. The taillamp 25 is supported at a rear of the vehicle 24 and can project light in a vehicle-reward direction.

The lights 30, shown in FIGS. 1 and 3-7, may be light emitting diodes (LEDs), or any other suitable type of light emitting structure. The lights 30 may be actuated, e.g., to an on-state in which the lights 30 produce light, to an off-state in which the lights 30 do not produce light, to provide various brightness levels, etc., e.g., in response to an instruction from the computer 26. In FIGS. 3-7, solid black dots illustrate lights 30 in the on-state, and dots with a black outline and white center illustrate lights 30 in the off-state. The lights 30 may be arranged in uniform series of rows, or any other suitable layout. The lights 30 may be individually selectively actuated, e.g., one light 30 may be actuated to the off-state, and an adjacent light 30 may be actuated to the on-state. For example, the lights 30 may be part of a network where each light 30 is a node on such network.

The lamp assembly 22 may include one or more conventional lights 31. Each conventional light 31 may include a light emitting structure, e.g., a tungsten element, a halogen element, a high-intensity discharge element, etc. Each conventional light may include a reflector and may be supported by the housing 23. The conventional lights 31 may be used along with the first set of lights 30a to provide light to operate the vehicle 24.

The vehicle 24 may include a navigation system 36, shown in FIG. 1, that determines a location and orientation of the vehicle 24 according to map data, e.g., by geocoordinates and compass heading direction that can be used to determine the vehicle 24 location and orientation on a map. The map data may include roads and related data, such as a number of lanes, parking lot locations, crosswalk 35 locations and dimensions, intersection 37 locations and dimensions, etc. To determine the location and orientation of the vehicle 24, the navigation system 36 may rely on data from a global navigation satellite system, distance data from sensors 38 attached to a drivetrain of the vehicle 24, a gyroscope, an accelerometer, a magnetometer, and/or other sensors 38. The map data may be stored locally, such as in the computer 26, in the navigation system 36, etc., and/or remotely, such as in a remote computer 40. Exemplary navigation systems 36 include known GPS (global positioning system) navigation devices, personal navigation devices, and automotive navigation systems.

The vehicle 24 may include sensors 38, shown in FIG. 1. The sensors 38 may detect internal states of the vehicle 24, for example, wheel speed, wheel orientation, and engine and transmission variables. The sensors 38 may detect the position or orientation of the vehicle 24, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 38 may detect the external world, for example, radar sensors, scanning laser range finders, light detection and ranging (LIDAR) devices, and image processing sensors such as cameras. The sensors 38 may include communications devices, for example, vehicle-to-infrastructure (V2I) or vehicle-to-vehicle (V2V) devices.

The vehicle 24 may include a communication network 39, shown in FIG. 1. The communication network 39 includes hardware, such as a communication bus, for facilitating communication among vehicle 24 components, e.g., the lamp assemblies 22, the navigation system 36, the sensors 38, the computer 26, etc. The communication network 39 may facilitate wired or wireless communication among the vehicle 24 components in accordance with a number of communication protocols such as controller area network (CAN), Ethernet, WiFi, Local Interconnect Network (LIN), and/or other wired or wireless mechanisms.

The computer 26, implemented via circuits, chips, or other electronic components, is included in the system 20 for carrying out various operations, including as described herein. The computer 26 is a computing device that includes a processor and a memory, the memory including one or more forms of computer-readable media, and storing instructions executable by the processor for performing various operations, including as disclosed herein. The memory of the computer 26 further generally stores remote data received via various communications mechanisms; e.g., the computer 26 is generally configured for communications on a controller area network (CAN) bus or the like, and/or for using other wired or wireless protocols, e.g., Bluetooth, etc. The computer 26 may also have a connection to an onboard diagnostics connector (OBD-II). Via the communication network 39, e.g., using Ethernet, WiFi, the CAN bus, Local Interconnect Network (LIN), and/or other wired or wireless mechanisms, the computer 26 may transmit messages to various devices in the vehicle 24 and/or receive messages from the various devices, e.g., the lamp assemblies 22, the sensors 38, the navigation system 36, etc. For example, the computer 26 may receive data from the sensors 38. Although one computer 26 is shown in FIG. 1 for ease of illustration, it is to be understood that the computer 26 could include, and various operations described herein could be carried out by, one or more computing devices.

The computer 26 may be programmed to determine whether to provide light via a lamp assembly 22. The determination may be based on a state of the vehicle 24. A state of the vehicle 24 is a set of one or more values that each provide a measure of a current condition of the vehicle 24, e.g., a measurement such as temperature of a component of the vehicle 24, a measurement of a physical attribute of the vehicle 24 such as speed, etc. Thus, in non-limiting examples, a state of the vehicle 24 could include one or more of a vehicle speed, heading, steering wheel angle, wheel angle, engagement or disengagement of a parking brake, fuel level, an ignition status (on or off), a powertrain status (engaged or not engaged), etc. A state of the vehicle 24 may be selected by an operator of the vehicle 24, e.g., an operator may select a drive state, park state, or reverse state with a gear shift lever, and the computer 26 may detect such selection based on data received from a sensor 38 that measures a position of the gear shift lever. The state of the vehicle 24 may be selected by the computer 24, e.g., the computer 24 may select the drive state, park state, or reverse state by sending an instruction via the communication network 39 to the vehicle 24 propulsion, braking, and/or steering, etc., e.g., the computer 24 may store a set of values providing measurements of vehicle 24 propulsion, braking, and/or steering while the computer 24 is operating the vehicle in an autonomous state. The determination may be based on factors independent of the vehicle 24, e.g., a time of day, an amount of ambient light, etc. The determination may be based on various combinations of states of vehicle 24 and/or factors independent of the vehicle 24. The determination may be based on a look-up table or the like according to various states of the vehicle 24, times of day, amounts of ambient light, etc., to provide light via a lamp assembly 22, e.g., to illuminate an environment external to the vehicle 24. When none of the various states of the vehicle 24, times of day, amounts of ambient light, etc., in the table are satisfied, the computer 26 may determine not to provide light via the lamp assembly 22.

The computer 26 may be programmed to determine specific parameters of light to provide. Light parameters, i.e., values for providing light, can include a direction, e.g., relative to the vehicle 24, e.g., as an indication of actuating the headlamp 25 or the taillamp 27, etc., and an amount of brightness. The determination may be based on a state of the vehicle 24, a time of day, an amount of ambient light, etc., including various combinations thereof. For example, the look-up table or the like for determining whether to provide light via a lamp assembly 22 according to various states of the vehicle 24, times of day, amounts of ambient light, etc., may also associate such states of the vehicle 24, times of day, amounts of ambient light, etc., with parameters of the light to be provided.

An example look-up table that can be implemented in the computer 26 to determine actuation of a headlamp 25 and/or a taillamp 27 is shown below:

TABLE 1

| Condition | Light to Actuate | Amount of Light to Provide |
| --- | --- | --- |
| Vehicle in Drive State | Headlamp | Between 400 and 1,200 candela |
| Time of Day Between 8 p.m. and 8 a.m. | Headlamp | Between 15,000 and 20,000 candela |
| Ambient Light Below Threshold, e.g., 1000 lux | Headlamp | Between 15,000 and 20,000 candela |
| Vehicle in Reverse State | Taillamp | Between 1,000 and 5,000 candela |

The computer 26 may be programmed to determine whether to provide a communication, and which communication to provide, if any, via the one or more lamp assemblies 22. The determination to provide a communication via the one or more lamp assemblies 22 may be based on a location of the vehicle 24, a detection of a pedestrian 34 within a threshold distance of the vehicle 24, e.g. 50 yards, map data, a detection of a second vehicle 42 within a threshold distance of the vehicle 24, the second vehicle 42 and/or pedestrian 34 having a right of way over the vehicle 24, etc., including a combination thereof.

The location of the vehicle 24 may be indicated by coordinates, such as Global Positioning System 20 (GPS) coordinates, and may be relative to map data, e.g., based on data from the sensors 38 and the navigation system 36.

The detection of a pedestrian 34 and/or a second vehicle 42 may be based on data from the sensors 38, e.g., data from a LIDAR sensor may indicate a pedestrian 34 and a distance D1 of such pedestrian 34 from the vehicle 24, a second vehicle 42 and a distance D2 of such second vehicle 42 from the vehicle 24, e.g., as shown in FIG. 2.

The right of way of the second vehicle 42 and/or the pedestrian 34 may be based on map data and the detection of the second vehicle 42 and/or the pedestrian 34. For example, the map data may indicate that a pedestrian 34 is in a crosswalk 35, that a second vehicle 42 stopped at a stop sign of an intersection 37 prior to the vehicle 24 arriving at the intersection, etc.

The threshold distance may be based on map data and the location of the vehicle 24. For example, when the vehicle 24 is near a crosswalk 35, the threshold distance may be a distance to the crosswalk 35 from the vehicle 24, e.g., a distance D3 from the vehicle 24 to a portion of the crosswalk farthest from the vehicle 24. As another example, when the location of the vehicle 24 is at a pick-up location, i.e., a location of the map data at which the vehicle 24 was instructed to pick-up an occupant, the threshold distance may be such that the pedestrian 34 can see the communication provided by the one or more lamp assemblies 22, e.g., 20 yards. As another example, when the vehicle 24 is at an entrance to an intersection, the threshold distance may be a distance to another entrance of the intersection. The threshold distance may be a minimum distance, e.g., 10 yards.

The communication may be an identification communication. An identification communication is a communication via a lamp assembly 22 that includes lights 30b selectively actuated to provide indicia to identify the vehicle 24, e.g., a visual pattern of shapes, a symbol, one or more alphanumeric characters, etc., e.g., indicating to a pedestrian 34 that the vehicle 24 is providing a pick-up for the pedestrian 34.

An identification communication may be based on a message received from the remote computer 40. For example, the remote computer 40 may transmit a pick-up request to the computer 26, i.e., a request for the computer 26 to navigate the vehicle 24 to a location to pick-up a pedestrian 34. The request may include an identification to communicate, e.g., initials of the pedestrian 34 waiting for the pick-up, or any other message to indicate to the pedestrian 34 the identification of the vehicle 24.

The communication may be a right of way communication. A right of way communication is a communication via a lamp assembly 22 that includes lights 30b selectively actuated to provide indicia of a right of way status of a pedestrian 34 or other vehicle 42 relative to the vehicle 24. For example, a right of way communication may inform a pedestrian 34 that he or she has right of way over the vehicle 24, e.g., that the vehicle 24 will yield to permit the pedestrian 34 to cross in front of the vehicle 24, etc.

The right of way communication may be stored on the memory of the computer 26. For example, the computer 26 may store various symbols commonly used for light based communication with pedestrians 34, e.g., a "walk" symbol, a "don't walk" symbol, etc.

The computer 26 may use a look-up table or the like to determine whether to provide a communication via the one or more lamp assemblies 22 and to determine which communication to provide. The look-up table may associate various conditions, e.g., a location of the vehicle 24 relative to the map data, a detection of a pedestrian 34 within a threshold distance, etc., with various light-based communications.

An example look-up table is shown below:

TABLE 2

| Condition | Light-Based Communication |
| --- | --- |
| Vehicle at crosswalk; pedestrian detected at crosswalk | Actuate lamp assembly to display "walk" symbol |
| Vehicle at pick-up location; pedestrian detected within threshold distance | Actuate lamp assembly to display identification included in pick-up request |
| Vehicle at intersection; second vehicle detected at intersection prior to arrival | Actuate lamp assembly to display "GO" text |
| Vehicle at crosswalk; pedestrian detected approaching crosswalk | Actuate lamp assembly to display "don't walk" sign |

The computer 26 may be programmed to selectively actuate one or more lights 30 of one or more lamp assemblies 22. For example, the computer 26 may actuate a first set of lights 30a to provide the light to operate the vehicle 24, actuate a second set of lights 30b to provide the communication, etc., e.g., as shown in FIGS. 4-7. The computer 26 may actuate the first set of lights 30a based on the determination whether to provide light via the lamp assembly 22, e.g., to operate the vehicle 24, and the determined specific parameters of light to provide. The computer 26 may actuate the second set of lights 30b based on the determination whether to provide a communication and the communication determined to provide. Actuating the lights 30 may include actuation to the on-state, to the off-state, to change brightness, etc.

For example, the computer 26 may transmit an instruction via the communication network 39 to one or more of the lamp assemblies 22 to actuate selected lights 30a, 30b of the one or more lamp assemblies 22. The instruction may include an indication of the light assembly 22, e.g., to actuate one or more lights 30 of a headlamp 25, an indication of the communication to provide, e.g., to actuate the headlamp 25 to provide a "walk" symbol, one or more addresses, i.e., identifying one or more lights 30a, 30b as a node of a network, of lights 30 to actuate, etc.

As another example, the computer 26 may store a look up table or the like specifying brightness levels for selected lights 30a. The selected lights 30a may include specific lights 30 of the lamp assembly 22 to actuate, e.g., the look up table may include addresses of specific lights 30 to actuate to provide various brightness levels. The computer 26 may actuate lights 30a that are associated with a specified brightness in the look up table, i.e., for which a brightness is specified, to provide the determined specific parameter of light.

As another example, the computer 26 may actuate the first set of lights 30a based on specified capabilities of each of the lights 30. The capability may be an amount of light a specified light 30 is capable of producing. For example, one of the lights may be specified as being capable of outputting 1,000 candela. For example, when the determined specific parameter of light to provide is 20,000 candela, the computer 26 may select the first set of lights 30a as twenty lights 30 of the lamp assembly 22, where each light 30 is capable of providing 1,000 candela.

When the determined specific parameter of light to provide is a range, the computer 26 may actuate the first set of lights 30a to provide a brightness at a higher end of the range. For example, when the determined specific parameter of light is a range of 15,000 to 20,000 candela, the computer 26 may actuate the first set of lights 30a to provide 20,000 candela. Actuating the first set of lights 30a to provide light at a high end of the range enables one or more lights 30 of the first set of lights 30a to be actuated to the off-state, e.g., to actuate the second set of lights 30b to provide a communication, while a remainder of the first set of lights 30a still provide light within the range.

Wide Area Network

A network 44 (sometimes referred to as the wide area network 44 because it can include communications between devices that are geographically remote from one another, i.e., not in a same building, vehicle, etc.,) represents one or more mechanisms by which remote devices, e.g., the computer 26, the remote computer 40, etc., may communicate with each other. Accordingly, the network 44 may be one or more wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized).

The Remote Computer

The remote computer 40 is a computing device that includes hardware, e.g. circuits, chips, antenna, etc., programmed to transmit, receive, and process data, to and from other computing devices such as the computer 26, etc., e.g., via the network 44. The remote computer 40 may be one or more computers, each generally including at least one processor and at least one memory, implemented as described herein, the memory storing instructions executable by the processor, including instructions for carrying out various process steps described herein. The remote computer 40 may store map data.

The remote computer 40 may be programmed to transmit a pick-up request to the computer 26, e.g., via the network 44. The pick-up request may include a location for the pick-up and an identification to provide with one or more of the light assemblies 22.

Process

Figure 8:
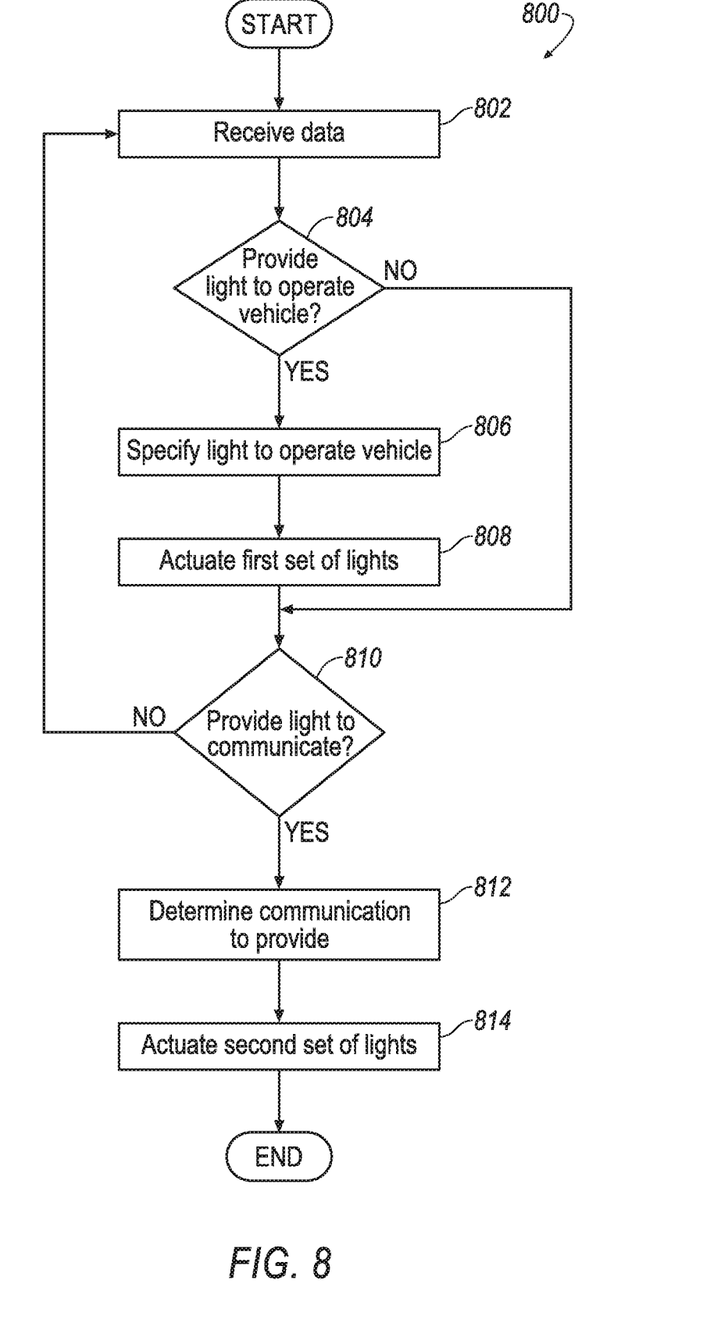
FIG. 8 is a flow chart of an example process for controlling the lamp assembly.

FIG. 8 is a process flow diagram illustrating an exemplary process 800 for controlling the light assembly 22 to provide light to operate the vehicle 24 and to communicate, e.g., with a pedestrian 34 and/or second vehicle 42.

The process 800 begins in a block 802 where the computer 26 receives data, e.g., from the sensors 38 via the communication network 39, from the remote computer 40 via the wide area network, etc. The computer 26 may continue to receive data throughout the process 800. Throughout the process 800 in the present context means substantially continuously or at time intervals, e.g., every 100 milliseconds.

Next, at a block 804, the computer 26 determines whether to actuate a first set of lights 30a of one or more lamp assemblies 22 to provide light to operate the vehicle 24. For example, the computer 26 may make such determination based on a state of the vehicle 24, a time of day, an amount of ambient light, etc., as described herein. Upon a determination that a first set of lights 30a should be actuated, the process 800 moves to a block 806. Upon a determination that a first set of lights 30a should not be actuated, the process 800 moves to a block 810.

At the block 806 the computer 26 determines specific parameters of light to provide to operate the vehicle 24 via a first set of lights 30a. For example, the parameters may be based on a state of the vehicle 24, a time of day, an amount of ambient light, etc., including various combinations thereof, as described herein.

Next, at a block 808 the computer 26 actuates the first set of lights 30a, e.g., based on specific parameters of light to provide determined in the block 806. For example, the computer 26 may transmit an instruction to one or more lamp assemblies 22 via the communication network 39, etc., as described herein.

At the block 810 the computer 26 determines whether to actuate a second set of lights 30b of the one or more lamp assemblies 22 to provide a communication. For example, the computer 26 may make such determination based on a location of the vehicle 24, a detection of a pedestrian 34 within a threshold distance of the vehicle 24, the map data, a detection of a second vehicle 42 within a threshold distance of the vehicle 24, the second vehicle 42 and/or pedestrian 34 having a right of way over the vehicle 24, etc., as described herein. The second set of lights 30b is typically selected from the same lights 30 that the first set of lights 30a was selected from. For example, the second set of lights 30b typically includes some, but not all, of the first set of lights 30a. Upon a determination that a second set of lights 30b should be actuated, the process 800 moves to a block 812. Upon a determination that a second set of lights 30b should not be actuated, the process 800 returns to the block 802.

At the block 812 the computer 26 determines the communication to provide via a second set of lights 30b. For example, the determination may be based on a location of the vehicle 24, a detection of a pedestrian 34 within a threshold distance of the vehicle 24, the map data, a detection of a second vehicle 42 within a threshold distance of the vehicle 24, the second vehicle 42 and/or pedestrian 34 having a right of way over the vehicle 24, etc., as described herein.

Next, at a block 814 the computer 26 actuates the second set of lights 30b based on the determined communication to provide in the block 812. For example, the computer 26 may transmit an instruction to one or more lamp assemblies 22 via the communication network 39, etc., as described herein. After the block 814 the process 800 may end. Alternately, the process 800 may return to the block 802.

Conclusion

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The article "a" modifying a noun should be understood as meaning one or more unless stated otherwise, or context requires otherwise. The phrase "based on" encompasses being partly or entirely based on.

The adjectives "first" and "second" are used throughout this document as identifiers and are not intended to signify importance or order.

What is claimed is:

1. A system, comprising a processor and a memory storing program instructions executable by the processor to:
    make a first determination to provide light that is required to operate a vehicle on a public roadway, the first determination based on at least one of a time of day or an amount of ambient light, and, based on the first determination, actuate a first set of lights of a headlamp assembly; and
    make a second determination to provide a specified communication that is specified from among a plurality of communications, and, based on the second determination, actuate a second set of lights of the headlamp assembly to provide the specified communication, the second set of lights based on the specified communication, wherein the first set of lights and the second set of lights include one or more same lights; and
    wherein the communication, including the second set of lights actuated to provide the communication, is visible on the headlamp assembly.

2. The system of claim 1, wherein the memory further stores instructions to actuate the second set of lights to provide the specified communication in response to receiving a message from a computer that is remote from the vehicle, the message indicating the specified communication.

3. The system of claim 1, wherein the memory further stores instructions to actuate the first set of lights to provide light having a brightness that is between a predetermined upper brightness threshold and a predetermined lower brightness threshold.

4. The system of claim 1, wherein the memory further stores instructions to actuate the second set of lights to provide the specified communication in response to detecting a second vehicle within a threshold distance of the vehicle and having a right of way over the vehicle.

5. The system of claim 1, wherein the memory further stores instructions to actuate one or more of the lights of the first set of lights to an off-state to actuate the second set of lights to provide the specified communication.

6. The system of claim 1, wherein the memory further stores instructions to actuate the second set of lights to provide the specified communication including at least one of a visual pattern of shapes, a symbol, and an alphanumeric character.

7. The system of claim 1, wherein the memory further stores instructions to actuate the second set of lights to provide the specified communication including indicia to identify the vehicle.

8. A method, comprising:
    making a first determination to provide light that is required to operate a vehicle on a public roadway, the first determination based on at least one of a time of day or an amount of ambient light, and, based on the first determination, actuating a first set of lights of a headlamp assembly;
    making a second determination to provide a specified communication specified from among a plurality of communications, and, based on the second determination, actuating a second set of lights of the headlamp assembly to provide the specified communication, the second set of lights based on the specified communication, wherein the first set of lights and the second set of lights include one or more same lights; and
    wherein the communication, including the second set of lights actuated to provide the communication, is visible on the headlamp assembly.

9. The method of claim 8, further comprising actuating the second set of lights to provide the specified communication in response to detecting a pedestrian within a threshold distance of the vehicle.

10. The method of claim 8, further comprising actuating the second set of lights to provide the specified communication based on a location of the vehicle.

11. The method of claim 8, further comprising actuating the second set of lights to provide the specified communication in response to detecting a second vehicle within a threshold distance of the vehicle and having a right of way over the vehicle.

12. The method of claim 8, further comprising actuating one or more of the lights of the first set of lights to an off-state to actuate the second set of lights to provide the specified communication.

13. The method of claim 8, further comprising determining a type of the communication before actuating the second set of lights to provide the specified communication.

14. The method of claim 13, wherein the type of the specified communication is one of identification and right of way.

15. A system, comprising:
    a headlamp assembly for a vehicle, the lamp assembly including a plurality of lights; and
    a computer having a processor and a memory storing program instructions executable by the processor to:
    make a first determination to provide light that is required to operate the vehicle on a public roadway, the first determination based on at least one of a time of day or an amount of ambient light, and, based on the first determination, actuate a first set of lights of the plurality of lights; and
    make a second determination to provide a specified communication specified from among a plurality of communications, and, based on the second determination, actuate a second set of lights of the plurality of lights to provide the communication, the second set of lights based on the specified communication, wherein the first set of lights and the second set of lights include one or more same lights; and
    wherein the communication, including the second set of lights actuated to provide the communication, is visible on the headlamp assembly.

16. The system of claim 15, wherein the plurality of lights are uniformly arranged in a plurality of rows.

17. The system of claim 15, wherein the lamp assembly includes a housing, and the plurality of lights are supported by the housing.

18. The system of claim 1, wherein the instructions include instructions to actuate the first set of lights of the headlamp assembly to provide at least 15,000 candela.

* * * * *